United States Patent
Erceg et al.

(10) Patent No.: US 11,601,942 B2
(45) Date of Patent: Mar. 7, 2023

(54) UNIFIED COORDINATION OF MULTIPLE PHYSICAL LAYER DEVICES

(71) Applicant: Avago Technologies International Sales Pte. Limited, Singapore (SG)

(72) Inventors: Vinko Erceg, San Diego, CA (US); Mark Gonikberg, Sunnyvale, CA (US); Rohit Gaikwad, San Diego, CA (US); Hongyu Xie, San Diego, CA (US); Anand Iyer, Sunnyvale, CA (US); Venkat Kodavati, Sunnyvale, CA (US); Tirdad Sowlati, Irvine, CA (US); Payam Torab Jahromi, Laguna Niguel, CA (US); Matthew J. Fischer, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 70 days.

(21) Appl. No.: 17/156,441

(22) Filed: Jan. 22, 2021

(65) Prior Publication Data
US 2021/0144711 A1    May 13, 2021

Related U.S. Application Data

(62) Division of application No. 15/616,887, filed on Jun. 7, 2017, now Pat. No. 10,932,262.
(Continued)

(51) Int. Cl.
*H04L 5/00* (2006.01)
*H04W 72/0453* (2023.01)
(Continued)

(52) U.S. Cl.
CPC ....... *H04W 72/0453* (2013.01); *H04L 5/0044* (2013.01); *H04L 5/0055* (2013.01);
(Continued)

(58) Field of Classification Search
CPC ............. H04W 16/28; H04W 72/0453; H04W 72/046; H04W 72/0466; H04W 72/085;
(Continued)

(56) References Cited

U.S. PATENT DOCUMENTS

2006/0092054 A1    5/2006  Li et al.
2007/0253386 A1    11/2007 Li
(Continued)

FOREIGN PATENT DOCUMENTS

DE              101587551 A1    6/2003

*Primary Examiner* — Brian P Cox
(74) *Attorney, Agent, or Firm* — BakerHostetler

(57) ABSTRACT

A device implementing unified coordination of wireless communications over multiple physical layers may include a MAC module communicatively coupled to first and second physical layer modules that are each configured to communicate with another device over first and second physical wireless channels, respectively. The MAC module may be configured to provide data to the first physical layer module for transmission to the another device over the first physical wireless channel, where the first physical wireless channel is associated with a first link parameter. The MAC module may be further configured to facilitate initializing the second physical wireless channel based at least in part on the first link parameter of the first physical wireless channel, and after initialization of the second physical wireless channel, provide second data to the second physical layer module for transmission to the another device over the second physical wireless channel.

20 Claims, 7 Drawing Sheets

Related U.S. Application Data

(60) Provisional application No. 62/509,659, filed on May 22, 2017.

(51) Int. Cl.

| | | |
|---|---|---|
| *H04L 69/18* | (2022.01) | |
| *H04L 69/324* | (2022.01) | |
| *H04L 69/08* | (2022.01) | |
| *H04L 69/323* | (2022.01) | |
| *H04W 16/28* | (2009.01) | |
| *H04W 72/044* | (2023.01) | |
| *H04W 72/08* | (2009.01) | |
| *H04L 101/622* | (2022.01) | |
| *H04W 80/02* | (2009.01) | |

(52) U.S. Cl.
CPC ............ *H04L 5/0058* (2013.01); *H04L 69/08* (2013.01); *H04L 69/18* (2013.01); *H04L 69/323* (2013.01); *H04L 69/324* (2013.01); *H04W 16/28* (2013.01); *H04W 72/046* (2013.01); *H04W 72/0466* (2013.01); *H04W 72/085* (2013.01); *H04L 2101/622* (2022.05); *H04W 80/02* (2013.01)

(58) Field of Classification Search
CPC .... H04W 80/02; H04L 5/0044; H04L 5/0055; H04L 5/0058; H04L 69/08; H04L 69/18; H04L 69/323; H04L 69/324; H04L 2101/622
See application file for complete search history.

(56) References Cited

U.S. PATENT DOCUMENTS

| | | | |
|---|---|---|---|
| 2009/0252143 | A1 | 10/2009 | Sridhara |
| 2010/0226349 | A1* | 9/2010 | Matsuo ................ H04L 1/188 370/445 |
| 2010/0303052 | A1 | 12/2010 | Visuri |
| 2011/0026623 | A1 | 2/2011 | Srinivasa |
| 2012/0307748 | A1 | 12/2012 | cheng |
| 2013/0301569 | A1 | 11/2013 | Wang |
| 2016/0338059 | A1 | 11/2016 | Huang |
| 2017/0085410 | A1 | 3/2017 | Lin |
| 2017/0195893 | A1 | 7/2017 | Lee |
| 2018/0184233 | A1* | 6/2018 | Alpert ................ H04L 5/001 |
| 2018/0278697 | A1 | 9/2018 | Cariou |
| 2018/0279262 | A1 | 9/2018 | Babaei |
| 2018/0316476 | A1* | 11/2018 | Sugaya ............... H04W 28/04 |
| 2018/0376374 | A1 | 12/2018 | Tranin |

* cited by examiner

UNIFIED COORDINATION OF MULTIPLE PHYSICAL LAYER DEVICES

CROSS-REFERENCE TO RELATED APPLICATIONS

The present application is a divisional of U.S. patent application Ser. No. 15/616,887, entitled "Unified Coordination of Multiple Physical Layer Devices," filed on Jun. 7, 2017, which claims the benefit of U.S. Provisional Patent Application Ser. No. 62/509,659, entitled "Unified Coordination of Multiple Physical Layer Devices," filed on May 22, 2017, each of which is hereby incorporated by reference in its entirety for all purposes.

TECHNICAL FIELD

The present description relates generally to unified coordination of multiple physical layer devices including unified coordination of transmissions over multiple physical layer devices.

BACKGROUND

Wireless devices may utilize one or more different wireless technologies to communicate over one or more frequency bands, such as 2.4 gigahertz (GHz), 5 GHz 60 GHz, etc. The different wireless technologies may be associated with different channel specific functions, such as channel access, link maintenance, and the like.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system, a unified MAC module is provided for coordinating multiple different PHYs, such as for coordinating concurrent transmissions over multiple different PHYs. The PHYs may be configured to communicate with a device over corresponding physical channels, such as corresponding physical wireless channels, where each of the PHYs is configured to communicate with the device over a different one of the corresponding physical channels. The unified MAC module may utilize one or more link parameters of an established first physical wireless channel corresponding to a first PHY to assist with establishing a second physical wireless channel corresponding to a second PHY. The link parameters may include, for example, a signal-to-noise ratio (SNR), a modulation and coding scheme (MCS) selection, a packet retransmission rate, beamforming parameters, and the like. In this manner, the unified MAC module may reduce the latency associated with establishing the second physical wireless channel.

The unified MAC module may also coordinate transmissions of acknowledgment packets over the multiple PHYs. For example, the unified MAC module may generate a block acknowledgment packet to acknowledge packets that are received over multiple different PHYs. The unified MAC module may defer transmission of the block acknowledgment packet for a period of time based on one or more factors, such as a retransmission buffer size at the transmitting device and/or a quality of service associated with one or more of the packets. The unified MAC module may select any of the PHYs for transmission of the block acknowledgment packet, such as based on channel availability or other factors. In one or more implementations, the block acknowledgment packet may include an indication of the PHY and/or corresponding physical wireless channel over which each of the packets was received. In this manner, the transmitting device is able to determine which channel a given packet was received over when the packet was transmitted over multiple channels.

Figure 1:
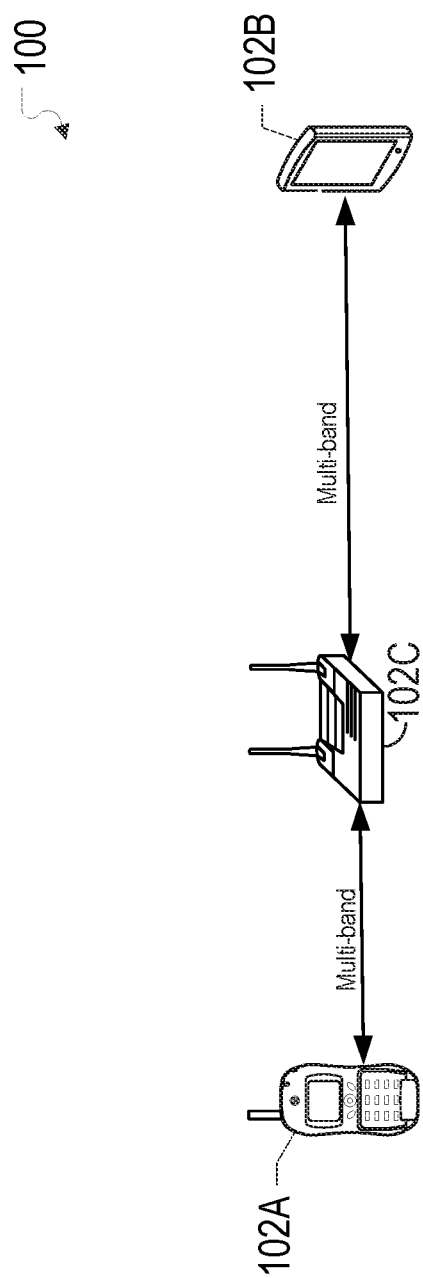
FIG. 1 illustrates an example network environment in which a system for unified coordination of multiple physical layer devices may be implemented in accordance with one or more implementations.

FIG. 1 illustrates an example network environment 100 in which a system for unified coordination of multiple physical layer devices may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more electronic devices 102A-C. The electronic devices 102A-C may communicate with one another using one or more wireless communication technologies, such as Wi-Fi (e.g. 802.11ac, 802.11ax, etc.), cellular (e.g. 3G, 4G, 5G, etc.), directional multi-gigabit (DMG), and/or mmWave (e.g. 802.11ad, 802.11ay, etc.). The electronic devices 102A-C may communicate with one another using single carrier transmissions and/or multi-carrier transmissions, such as orthogonal frequency-division multiplexing transmissions.

The electronic devices 102A-C may be, for example, base stations, access points, routers, portable computing devices such as laptop computers, smartphones, tablet devices, wearable devices such as a watch, a band, and the like, or any other appropriate device that includes, for example, one or more wireless interfaces. In FIG. 1, by way of example, the electronic device 102A is depicted as a mobile device, the electronic device 102B is depicted as a tablet device, and the electronic device 102C is depicted as a base station. The electronic devices 102A-C may be, and/or may include all or part of, the electronic devices discussed below with respect to FIGS. 2-4, and/or the electronic system discussed below with respect to FIG. 7.

In one or more implementations, one or more of the electronic devices 102A-B may communicate with the electronic device 102C, e.g. a base station or access point, and/or the electronic devices 102A-B may communicate directly with one another using peer-to-peer transmissions, e.g. bypassing the electronic device 102C, and/or independent of coordination from the electronic device 102C. For explanatory purposes, multiple different wireless and wired technologies are described herein. However, the subject system is PHY-independent and can be uniformly implemented across generally any communication technology.

In the subject system, the electronic devices 102A-C may each include a unified MAC module for controlling multiple different PHYs. The unified MAC module allows for each of the electronic devices 102A-C to communicate over multiple different PHYs concurrently. The unified MAC module supports any number/type of concurrent PHYs, such as real simultaneous dual band (RSDB) communications with a 2.4 GHz PHY and a 5 GHz PHY, single in-band communications with two 5 GHz PHYs, an 802.11ax 2.4 GHz PHY and one or more 802.11ad PHYs, and the like.

The unified MAC module may support full duplex, frequency division duplexing (FDD), and/or multiple PHYs per band, such as multiple different 802.11ad PHYs. The unified MAC module supports transmitting/receiving any packets (e.g. data, management, extension, acknowledgements, etc.) by any PHY or by one or more PHYs in any order. The data may be transmitted in chunks or in packets. The unified MAC module further allows for the use of different PHYs for uplink/downlink, transmission/acknowledgment, transmission/retransmission, and the like.

The unified MAC module may select one or more PHYs to use for a given transmission based on one or more parameters, such as link budget (assessed service availability) of the wireless channels corresponding to the PHYs, the amount of data to be transmitted, wireless link quality of the channels corresponding to the PHYs (e.g., RSSI (Received Signal Strength Indication), SINR (Signal-to-Interference-plus-Noise Ratio), PDR (Packet-Delivery Ratio), and/or BER (Bit-Error Rate)), power impact, channel availability, delay, quality of service, and the like. Example unified MAC modules are discussed further below with respect to FIGS. 2-4.

The unified MAC module may coordinate the establishment of physical wireless channels over the PHYs. For example, the unified MAC module may utilize one or more link parameters associated with a first physical wireless channel over a first PHY to facilitate and/or assist with establishing a second physical wireless channel over a second PHY. The one or more link parameters may include, for example, RSSI, SINR, PDR, BER, SNR, MCS selection, beamforming parameters, and the like. An example process of coordinated link establishment is discussed further below with respect to FIG. 5.

The unified MAC module may also coordinate sending acknowledgment packets for packets received over multiple of the PHYs. For example, the unified MAC module may generate a block acknowledgment packet for acknowledging packets received over multiple PHYs. The block acknowledgment packet may indicate that a given packet was received and may also indicate the PHY and/or corresponding physical wireless channel over which the packet was received, e.g. such that a transmitting device can determine the channel over which a packet was received when the same packet was transmitted over multiple channels. The unified MAC module may defer transmission of the block acknowledgment packet when one or more factors are met, such as to add additional acknowledgments to the block acknowledgment packet. The unified MAC module may then select one of the PHYs for transmission of the block acknowledgment packet, such as based on channel availability. An example process of an example process of coordinated packet acknowledgment for multiple PHYS is discussed further below with respect to FIG. 6.

Figure 2:
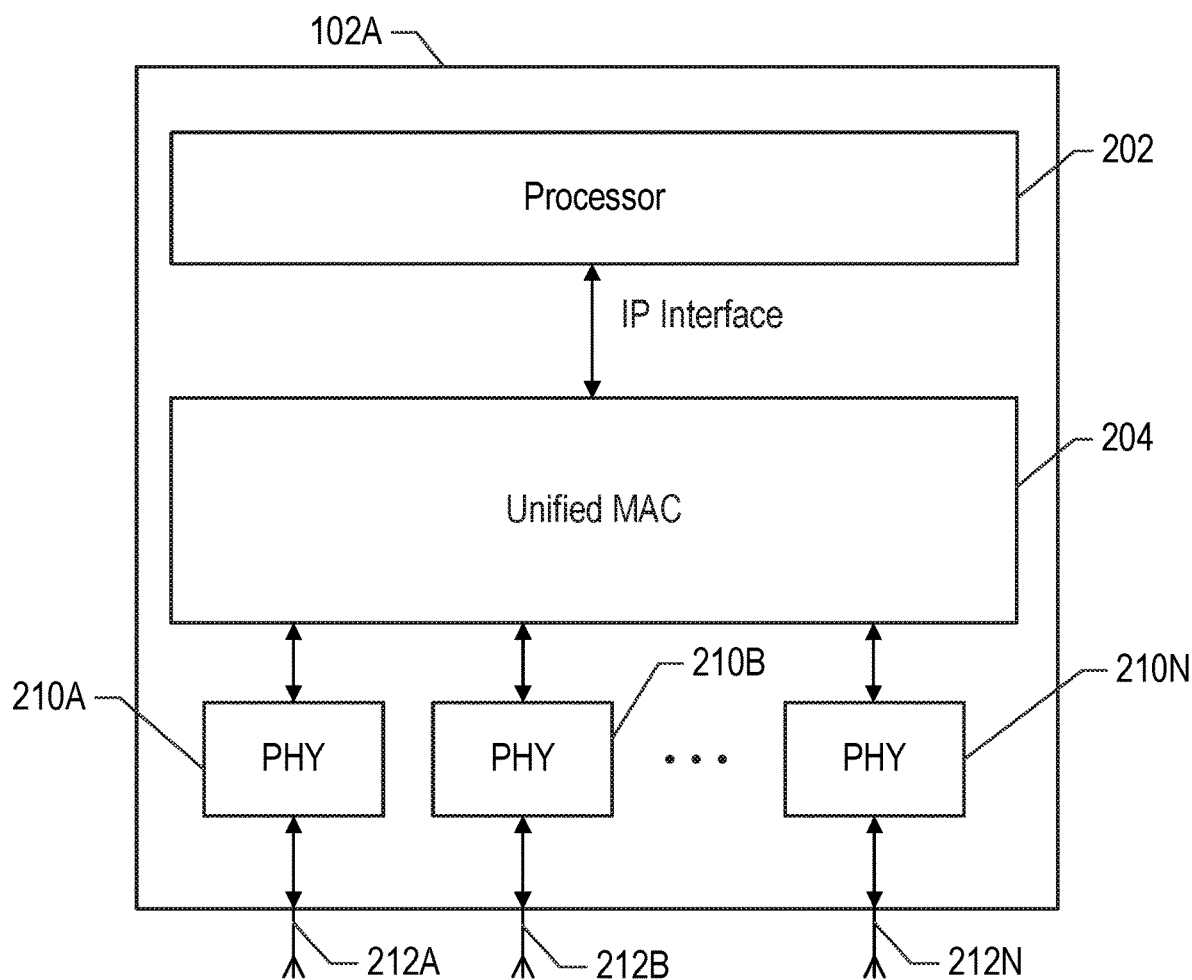
FIG. 2 illustrates an example electronic device implementing a unified MAC for multiple PHYs in accordance with one or more implementations.

FIG. 2 illustrates an example electronic device 102A implementing a unified MAC for multiple PHYs in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include, among other components, a processor 202, a unified MAC module 204, one or more PHYs 210A-N, and one or more antennas 212A-N. The unified MAC module 204 may be communicatively coupled to the processor 202, such as via one or more internet protocol (IP) interfaces. The one or more IP interfaces may be used to communicate one or more data flows between the processor 202 and the unified MAC module 204. In this manner, the inner workings of the unified MAC module 204 and/or the PHYs 210A-N are transparent to the processor 202 and/or applications executing thereon.

The unified MAC module 204 may receive data from the processor 202, select one or more of the PHYs 210A-N for transmitting the data, packetize/process the data, and provide all or part of the packetized/processed data to the selected PHYs 210A-N for transmission over corresponding physical wireless channels. The unified MAC module 204 may also receive data from the PHYs 210A-N, combine/depacketize/process the data, and provide the processed data to the processor 202.

The processor 202, which may also be referred to as an application/host processor, may include suitable logic, circuitry, and/or code that enable processing data and/or controlling operations of the electronic device 102A. In this regard, the processor 202 may be enabled to provide control signals to various other components of the electronic device 102A. The processor 202 may also control transfers of data to/from the electronic device 102A. For example, the processor 202 may provide data items, such as packets, chunks, or a raw or unformatted data stream, to the unified MAC module 204 for transmission by one or more of the PHYs 210A-N, and the processor 202 may receive data items, such as packets, chunks, or a raw or unformatted data stream, from the unified MAC module 204.

The PHYs 210A-N may be physical layer devices (or physical layer modules) for communicating over physical wireless channels on one or more frequency bands, such as 2.4 GHz, 5 GHz, 60 GHz, or generally any frequency band. The PHYs 210A-N may each be separate circuits and/or the PHYs 210A-N may share one or more circuits or components. In one or more implementations, the PHYs 210A-N may share the one or more antennas 212A-N. Each of the PHYs 210A-N may be configured for communication over a physical wireless channel on one of the frequency bands; however, the PHYs 210A-N may be reconfigurable for communication over others of the frequency bands. In one or more implementations, one or more of the PHYs 210A-N may be compliant with one or more specifications, such as 802.11n, 802.11ax, 802.11ad, etc.

In one or more implementations, all or part of the unified MAC module 204 may be implemented on dedicated circuitry and/or all or part of the unified MAC module 204 may be implemented by the processor 202. In one or more implementations, the unified MAC module 204 may be backwards compatible with one or more of 802.11n, 802.11ac, 802.11ax, etc., and the unified MAC module 204 may provide extended functionality.

In one or more implementations, one or more of the processor 202, the unified MAC module 204, the PHYs 210A-N, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 3:
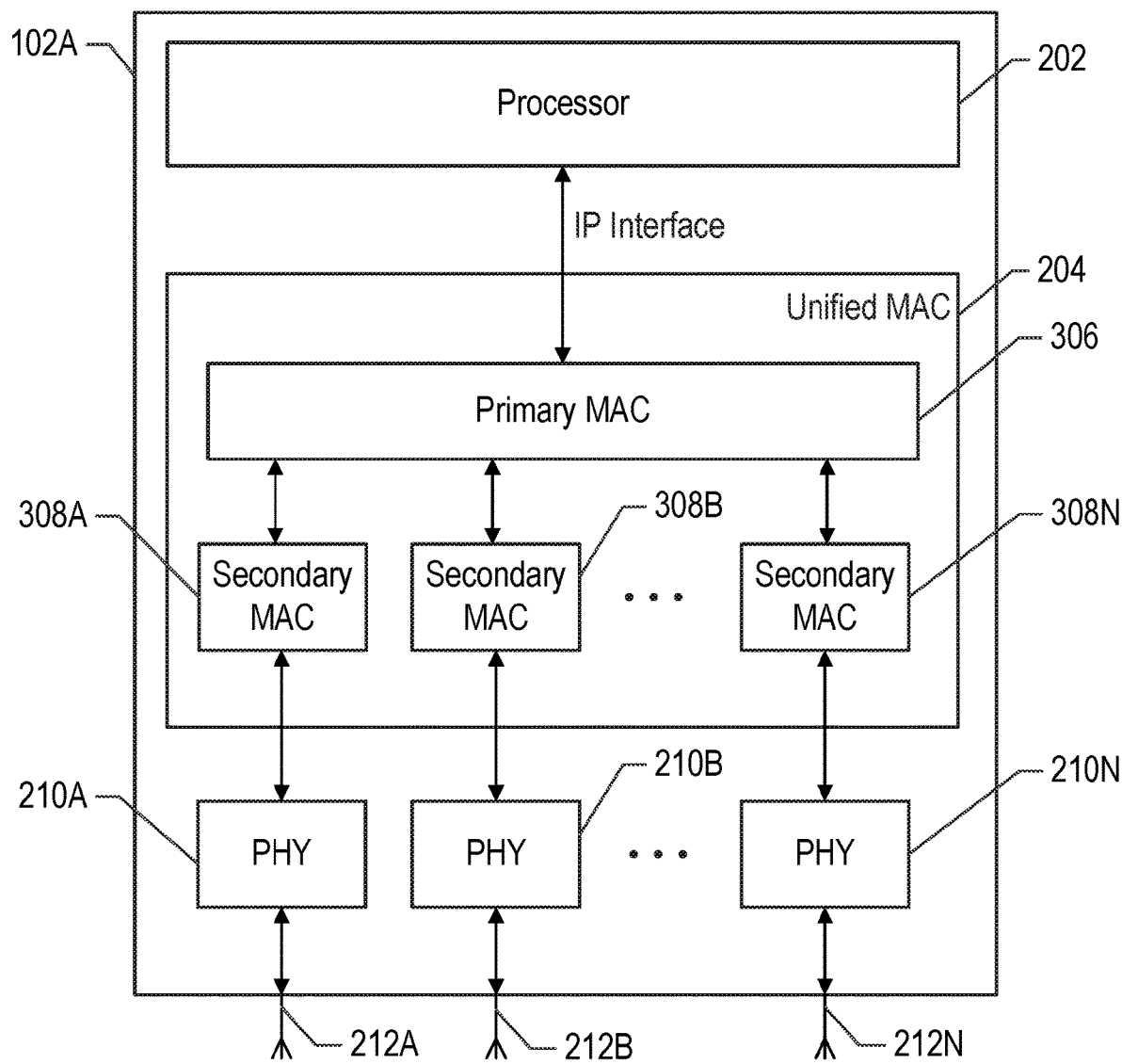
FIG. 3 illustrates an example electronic device implementing a unified MAC for multiple PHYs in accordance with one or more implementations.

FIG. 3 illustrates an example electronic device 102A implementing a unified MAC for multiple PHYs in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include, among other components, the processor 202, the unified MAC module 204, the one or more PHYs 210A-N, and the one or more antennas 212A-N. The unified MAC module 204 may include a primary MAC module 306 and one or more secondary MAC modules 308A-N. The primary MAC module 306 may be communicatively coupled to the processor 202, such as via one or more internet protocol (IP) interfaces. The primary MAC module 306 may also be communicatively coupled to each of the secondary MAC modules 308A-N. In one or more implementations, there may be a single MAC address assigned to the unified MAC module 204. Accordingly, the single MAC address is shared across the primary MAC module 306 and the secondary MAC modules 308A-N.

The primary MAC module 306 may receive data from the processor 202, select one or more of the secondary MAC modules 308A-N and associated PHYs 210A-N for transmitting the data, packetize/process the data, and provide all or part of the packetized/processed data to the selected secondary MAC modules 308A-N for transmission. The primary MAC module 306 may also receive data from the secondary MAC modules 308A-N, combine/depacketize/process the data, and provide the processed data to the processor 202. An example process of the primary MAC module 306 is discussed further below with respect to FIG. 5.

The processor 202 may provide data items, such as packets, chunks, or a raw or unformatted data stream, to the primary MAC module 306 for transmission by one or more of the PHYs 210A-N, and the processor 202 may receive data items, such as packets, chunks, or a raw or unformatted data stream, from the primary MAC module 306.

The secondary MAC modules 308A-N may each be associated with, and communicatively coupled to, one of the PHYs 210A-N. The secondary MAC modules 308A-N may handle the channel/PHY specific functions with respect to each of the PHYs 210A-N, such as channel access and/or link management with respect to respective channels over the PHYs 210A-N. The secondary MAC modules 308A-N may receive data from the primary MAC module 306 and pass the data to the PHYs 210A-N for transmission over the respective channels to one or more other electronic devices 102B-C, such as the electronic device 102C. Similarly, the secondary MAC modules 308A-N may receive data from the PHYs 210A-N and may provide the received data to the primary MAC module 306. An example process of a secondary MAC module 308A is discussed further below with respect to FIG. 6.

In one or more implementations, all or part of the unified MAC module 204 may be implemented on dedicated circuitry and/or all or part of the unified MAC module 204 may be implemented by the processor 202. The primary MAC module 306 may be implemented on a same integrated circuit as the secondary MAC modules 308A-N, or the primary MAC module 306 may be implemented on a separate integrated circuit than one or more of the secondary MAC modules 308A-N. The primary MAC module 306 and/or the secondary MAC modules 308A-N may be configured to power on/off each of the corresponding PHYs 210A-N. In one or more implementations, the unified MAC module 204 may be backwards compatible with one or more of 802.11n, 802.11ac, 802.11ax, etc., and the unified MAC module 204 may provide extended functionality.

In one or more implementations, one or more of the processor 202, the unified MAC module 204, the primary MAC module 306, the secondary MAC modules 308A-N, the PHYs 210A-N, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 4:
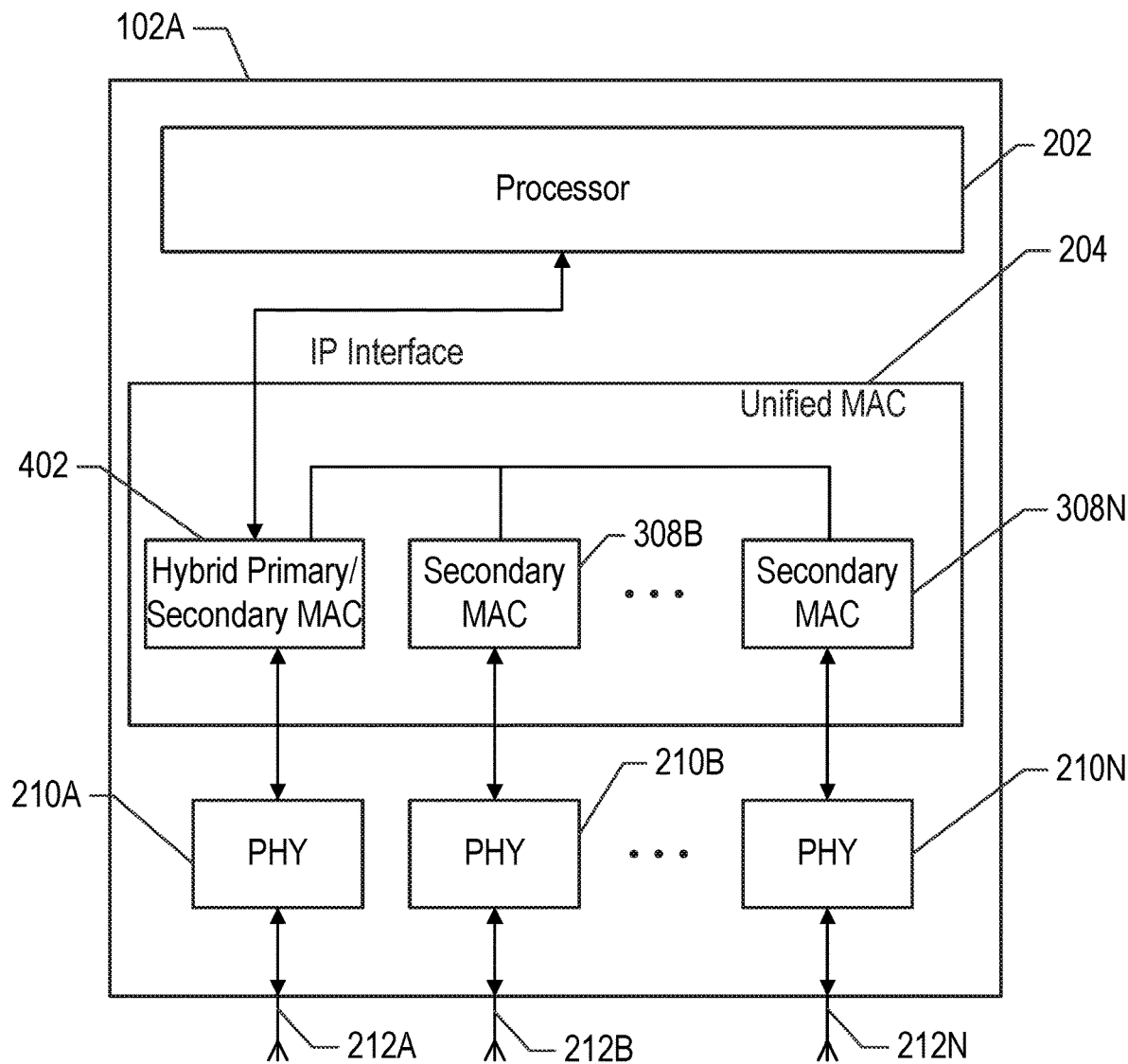
FIG. 4 illustrates an example electronic device implementing a unified MAC for multiple PHYs in accordance with one or more implementations.

FIG. 4 illustrates an example electronic device 102A implementing a unified MAC for multiple PHYs in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include, among other components, a processor 202, a unified MAC module 204, one or more PHYs 210A-N, and one or more antennas 212A-N. The unified MAC module 204 may include a hybrid primary/secondary MAC module 402 and one or more secondary MAC modules 308B-N. The hybrid primary/secondary MAC module 402 may be communicatively coupled to the processor 202, such as via one or more internet protocol (IP) interfaces. The hybrid primary/secondary MAC module 402 may also be communicatively coupled to each of the secondary MAC modules 308B-N.

The hybrid primary/secondary MAC module 402 may receive data from the processor 202, select one or more of the secondary MAC modules 308B-N (and/or itself) and associated PHYs 210A-N for transmitting the data, packetize/process the data, and provide all or part of the packetized/processed data to the selected secondary MAC modules 308B-N (and/or itself). The hybrid primary/secondary MAC module 402 may also receive data from the secondary MAC modules 308B-N (and/or the PHY 210A), combine/depacketize/process the data, and provide the processed data to the processor 202. Thus, the hybrid primary/secondary MAC module 402 may perform the functions of the primary MAC module 306 as well as the functions of the secondary MAC module 308A.

In one or more implementations, each of the secondary MAC modules 308A-N in FIG. 3 may be configurable to function as the hybrid primary/secondary MAC module 402. For example, the secondary MAC modules 308A-N may elect one of the secondary MAC modules 308A-N to function as the hybrid primary/secondary MAC module 402, the first of the secondary MAC modules 308A-N in use may become the hybrid primary/secondary MAC module 402, and/or one of the secondary MAC modules 308A-N may be selected at random to function as the hybrid primary/secondary MAC module 402, such as for a predetermined amount of time.

In one or more implementations, one or more of the processor 202, the unified MAC module 204, the hybrid primary/secondary MAC module 402, the secondary MAC modules 308B-N, the PHYs 210A-N, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 5:
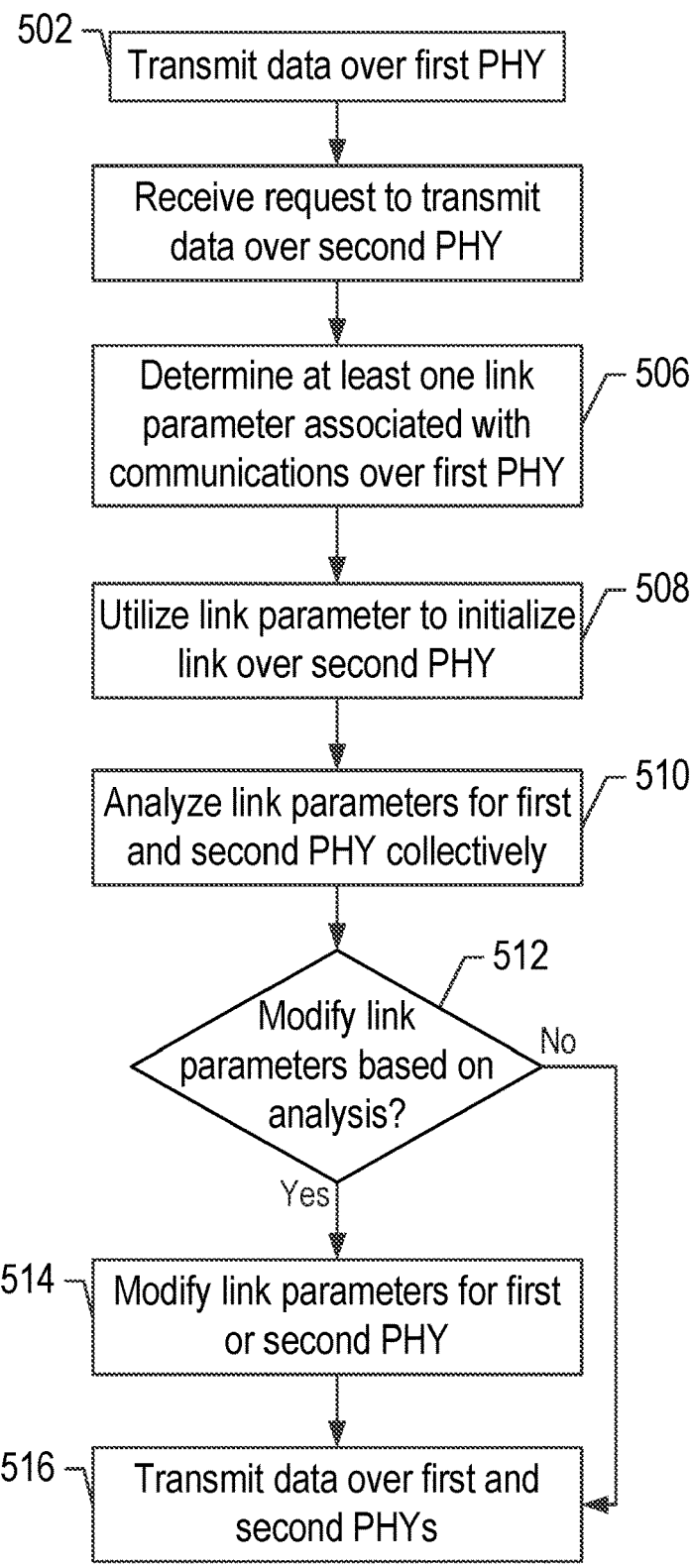
FIG. 5 illustrates a flow diagram of an example process of coordinated link establishment in a system for unified coordination of multiple physical layer devices in accordance with one or more implementations.

FIG. 5 illustrates a flow diagram of an example process 500 of coordinated link establishment in a system for unified coordination of multiple physical layer devices in accordance with one or more implementations. For explanatory purposes, the process 500 is primarily described herein with reference to the unified MAC module 204 of the electronic device 102A of FIG. 2. However, the process 500 is not limited to the unified MAC module 204 of the electronic device 102A of FIG. 2, and one or more blocks (or operations) of the process 500 may be performed by one or more other components or chips of the electronic device 102A. For example, one or more blocks of the process 500 may be performed by primary MAC module 306 and/or one or more of the secondary MAC modules 308A-N of FIG. 3, and/or by the hybrid primary/secondary MAC module 402 of FIG. 4. The electronic device 102A also is presented as an exemplary device and the operations described herein may be performed by any suitable device, such as one or more of the electronic devices 102B-C. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 begins with the unified MAC module 204 coordinating data communications over one or more of the PHYs 210A-N, such as the PHY 210A, to another electronic device 102C (502). The unified MAC module may receive a request to transmit data over a second PHY, such as the PHY 210B, to the another electronic device 102C (504). For example, the unified MAC module 204 may receive a request, such as from the processor 202, to increase the bandwidth of the communications with the electronic device 102C, such as by establishing a second physical wireless channel over an additional PHY 210B. Alternatively, and/or in addition, the unified MAC module 204 may receive a request to switch physical wireless channels, and consequently switch from the PHY 210A to, for example, the PHY 210B.

The unified MAC module 204 determines at least one link parameter associated with the communications over the first physical wireless channel of the first PHY 210A (506). The link parameter may relate to, for example, the signal quality of the first physical wireless channel, such as a packet retransmission rate, SNR, SINR, and the like. Alternatively and/or in addition, the link parameter may relate to MCS selection and/or may relate to directional beamforming.

The unified MAC module 204 utilizes the link parameter to assist with initializing a link for a second physical wireless channel over the second PHY 210B (508). The unified MAC module 204 may utilize the SNR to determine an appropriate frequency band for the second physical wireless channel. For example, if the first physical wireless channel is at a lower frequency, such as 2.4 GHz, and the SNR indicates that the link quality is below a threshold, the unified MAC module 204 may not select a higher frequency, such as 5 GHz or 60 Ghz for the second physical wireless channel. However, if the first physical wireless channel is at a lower frequency, such as 2.4 GHz, and the SNR indicates that the link quality is above a first threshold, the unified MAC module 204 may select a 5 GHz channel for the second physical wireless channel. Furthermore, if the SNR indicates that the link quality is above a second threshold, which is greater than the first threshold, the unified MAC module 204 may select a 60 GHz channel for the second physical wireless channel. In one or more implementations, the SNR values may be linearly and/or non-linearly related to the link quality.

In one or more implementations, the unified MAC module 204 may utilize the MCS selection of the first physical wireless channel to select an initial MCS for the second physical wireless channel. For example, the unified MAC module 204 may store and track different MCS selections by different concurrent physical wireless channels. The unified MAC module 204 may utilize the tracked data to map the MCS selections between the channels, e.g. 2.4 GHz, 5 GHz, and 60 GHz. For example, if the unified MAC module 204 tracks data indicating that when a 5 GHz channel uses MCS 5, a 60 GHz channel typically utilizes MCS 7, the unified MAC module 204 may store a mapping between MCS 5 for 5 GHz and MCS 7 for 60 GHz. The unified MAC module 204 may further store data regarding the wireless environment in conjunction with the mappings of the MCS selections. For example, the unified MAC module 204 may store SNR values, ambient temperature values, or generally any data that may be sense, measured, and/or collected by the electronic device 102A.

In one or more implementations, the unified MAC module 204 may track the MCS selections of the various channels over time in association with one or more wireless environment parameters. The unified MAC module 204 may utilize the tracked data to generate a predictive model that can be used to predict the appropriate MCS selection for a channel at a first frequency based on the MCS selection of a current channel at a second frequency that differs from the first frequency. The model may further incorporate one or more parameters regarding the wireless environment, such as SNR of the current channel, ambient temperatures, and the like. The model may be, for example, a machine learning model that may be generated by the processor 202 based on data collected by the unified MAC module 204, and then provided to the unified MAC module 204 by the processor 202. The processor 202 may periodically or aperiodically receive additional data from the unified MAC module 204, and the processor 202 may regenerate the model, such as when a threshold amount of additional data has been received.

The unified MAC module 204 may also use one or more directional beamforming settings from a first physical wireless channel to facilitate initial directional beamforming settings for a second physical wireless channel. The beamforming settings may include, for example, phase weights that are applied to phase shifters to form a beam in a particular direction. Alternatively, and/or in addition, the unified MAC module 204 may utilize the known directional information associated with beamforming on the first physical wireless channel to determine initial directional beamforming settings for the second physical wireless channel. Furthermore, the unified MAC module 204 may also utilize a predictive model with respect to the beamforming settings for the different channels.

After initializing the second physical wireless channel over the second PHY 210B (508), the unified MAC module 204 analyzes the link parameters for the first and second PHYs 210A-B collectively, and/or in aggregate (510). For example, the unified MAC module 204 may perform a superset MCS selection that involves concurrently selecting the appropriate MCSs for the PHYs 210A-B in aggregate. If the superset MCS selection results in a different MCS to be implemented by the first or second PHYs 210A-B (512), the unified MAC module 204 modifies the link parameters, e.g. the MCS selections, for the first and/or second PHYs 210A-B (514). In one or more implementations, the initial MCS selections for each of the PHYs 210A-B may be determined by the corresponding secondary MAC modules 308A-B, and the superset MCS selection for the PHYs 210A-B in aggregate may be determined by the primary MAC module 306.

The unified MAC module 204 then transmits data over the first and second PHYs 210A-B concurrently (516). If the unified MAC module 204 determines that the link parameters do not need to be modified based on the analysis (512), the unified MAC module 204 bypasses modifying the link parameters (514) and transmits data over the first and second PHYs 210A-B concurrently (516). In one or more implementations, first physical wireless channel corresponding to the first PHY 210A may be terminated when the second physical wireless channel corresponding to the second PHY 210B is established, such as to effectuate a switch from the first physical wireless channel to the second physical wireless channel.

Figure 6:
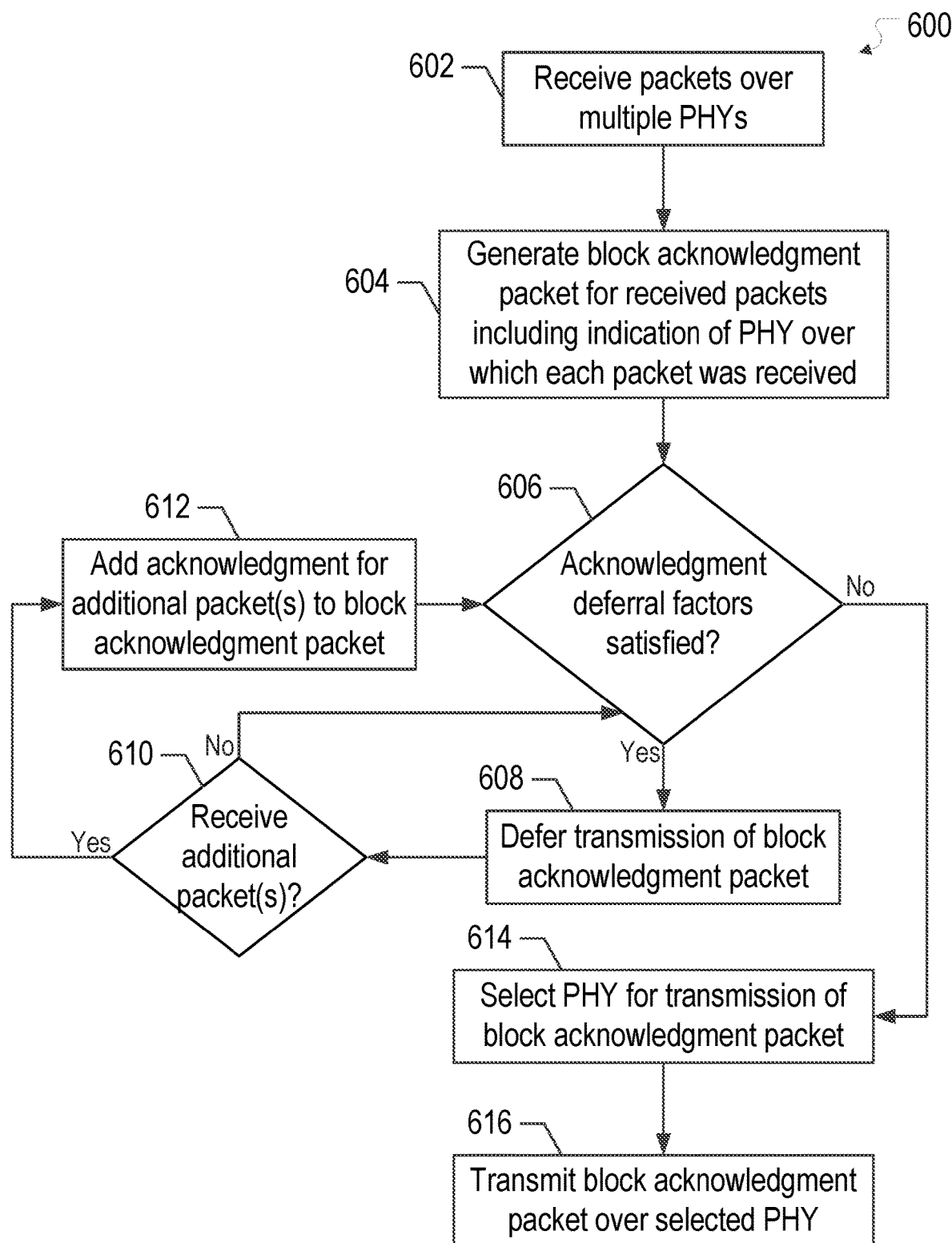
FIG. 6 illustrates a flow diagram of an example process of coordinated packet acknowledgment in a system for unified coordination of multiple physical layer devices in accordance with one or more implementations.

FIG. 6 illustrates a flow diagram of an example process 600 of coordinated packet acknowledgment in a system for unified coordination of multiple physical layer devices in accordance with one or more implementations. For explanatory purposes, the process 600 is primarily described herein with reference to the unified MAC module 204 of the electronic device 102A of FIG. 2. However, the process 600 is not limited to the unified MAC module 204 of the electronic device 102A of FIG. 2, and one or more blocks (or operations) of the process 600 may be performed by one or more other components or chips of the electronic device 102A. For example, one or more blocks of the process 600 may be performed by primary MAC module 306 and/or one or more of the secondary MAC modules 308A-N of FIG. 3, and/or by the hybrid primary/secondary MAC module 402 of FIG. 4. The electronic device 102A also is presented as an exemplary device and the operations described herein may be performed by any suitable device, such as one or more of the electronic devices 102B-C. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

In the process 600 for coordinated packet acknowledgment, the unified MAC module 204 receives packets from another electronic device 102C over multiple PHYs 210A-N (602). For example, each of the PHYs 210A-N may be associated with a different physical wireless channel over which packets are received from the electronic device 102C. The unified MAC module 204 generates a block acknowledgment packet indicating that each of the packets has been received, where the block acknowledgment packet further includes an indication of the wireless channel (and/or one of the PHYs 210A-N) over which each of the packets was received (604). In one or more implementations, the block acknowledgment packet may further incorporate one or more negative acknowledgment (or NACK) packets that indicate that one or more packets were not received.

For example, the block acknowledgment packet may include a sequence number (or other identifier) or range of sequence numbers corresponding to the packets that were received (and/or that were not received). The block acknowledgment packet may further include a bit associated with each of the sequence numbers, where the bit indicates one of the PHYs 210A-N over which the corresponding packet was received.

In one or more implementations, the secondary MAC modules 308A-N may generate individual acknowledgment packets, or individual block acknowledgment packets, for the packets that were received over the corresponding PHYs 210A-N. The secondary MAC modules 308A-N may further include a bit in each acknowledgment packet that is effectively an identifier of the corresponding PHYs 210A-N and/or an identifier of the physical wireless channels corresponding to the PHYs 210A-N. The secondary MAC modules 308A-N may transmit the block acknowledgment packets (or individual acknowledgment packets) to the primary MAC module 306, and the primary MAC module 306 may aggregate the acknowledgment packets into a single block acknowledgment packet. The single block acknowledgment packet may then be provided to any of the secondary MAC modules 308A-N for transmission over the corresponding PHYs 210A-N, irrespective of whether the block acknowledgment packet includes an acknowledgment for a packet received over the corresponding PHYs 210A-N. Thus, a block acknowledgment packet that does not include any acknowledgments for packets received over the PHY 210A may be transmitted over the PHY 210A.

The unified MAC module 204 determines whether one or more acknowledgment packet deferral factors are satisfied (606). The acknowledgment packet deferral factors may be based on, for example, a retransmission buffer size at the transmitting device, e.g. the electronic device 102C, quality of service (QoS) requirements associated with the packets being received over the PHYs 210A-N, and the like. For example, the electronic device 102C may have a fixed size retransmission buffer that can only hold a certain number of packets. Accordingly, the block acknowledgment packet should be transmitted back to the electronic device 102C before the retransmission buffer is full at the electronic device 102C, such that any packets that need to be retransmitted are still available at the electronic device 102C. Alternatively, and/or in addition, one or more packets being received over the PHYs 210A-N may be associated with a particular QoS that requires minimal latency with respect to retransmissions, such as voice over IP, video conferencing, and the like. Accordingly, in this instance the unified MAC module 204 may not defer the transmission of the block acknowledgment packet.

If the one or more acknowledgement deferral factors are satisfied (606), the unified MAC module 204 defers the transmission of the block acknowledgment packet (608) and waits to receive additional packets over the PHYs 210A-N. If one or more additional packets are received over the PHYs 210A-N (610), the unified MAC module 204 adds acknowledgments for the received packets to the block acknowledgment packet (612) and confirms that the acknowledgment deferral factors are still satisfied (606). Similarly, if additional packets are not received (610), the unified MAC module 204 confirms that the acknowledgment deferral factors are still satisfied (606).

When the unified MAC module 204 determines that the acknowledgment deferral factors are no longer satisfied (606), the unified MAC module 204 selects one or more of the PHYs 210A-N for transmission of the block acknowledgment packet (614). The selection of the one or more PHYs 210A-N for transmission of the block acknowledgment packet may be based one or more of channel availability, signal strength, and the like. The unified MAC module 204 then coordinates the transmission of the block acknowledgment packet over the selected one or more of the PHYs 210A-N (616).

Figure 7:
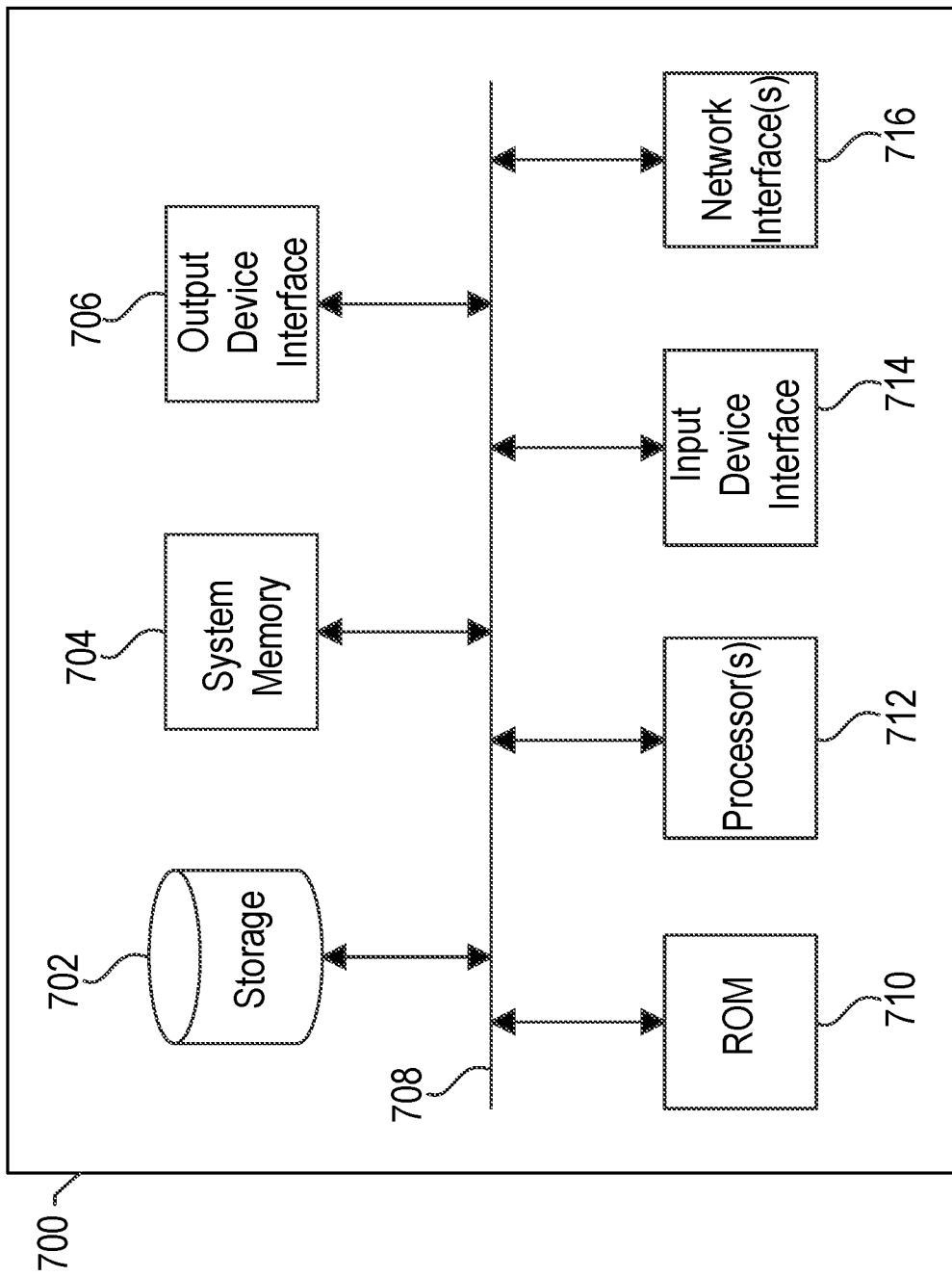
FIG. 7 conceptually illustrates an electronic system with which one or more implementations of the subject technology may be implemented.

FIG. 7 conceptually illustrates an electronic system 700 with which one or more implementations of the subject technology may be implemented. The electronic system 700, for example, may be, or may be coupled to, a gateway device, a set-top box, a desktop computer, a laptop computer, a tablet computer, a server, a switch, a router, a base station, a receiver, a phone, or generally any electronic device that transmits wired or wireless signals. The electronic system 700 can be, and/or can be a part of, one or more of the electronic devices 102A-C. Such an electronic system includes various types of computer readable media and interfaces for various other types of computer readable media. The electronic system 700 includes a bus 708, one or more processor(s) 712, a system memory 704 or buffer, a read-only memory (ROM) 710, a permanent storage device 702, an input device interface 714, an output device interface 706, and one or more network interface(s) 716, or subsets and variations thereof.

The bus 708 collectively represents all system, peripheral, and chipset buses that communicatively connect the numerous internal devices of the electronic system 700. In one or more implementations, the bus 708 communicatively connects the one or more processor(s) 712 with the ROM 710, the system memory 704, and the permanent storage device 702. From these various memory units, the one or more processor(s) 712 retrieve instructions to execute and data to process in order to execute the processes of the subject disclosure. The one or more processor(s) 712 can be a single processor or a multi-core processor in different implementations.

The ROM 710 stores static data and instructions that are needed by the one or more processor(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processor(s) 712 may need at runtime. In one or more implementations, the processes of the subject disclosure are stored in the system memory 704, the permanent storage device 702, and/or the ROM 710. From these various memory units, the one or more processor(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, the bus 708 also couples the electronic system 700 to one or more networks (not shown) through one or more network interface(s) 716. One or more network interface(s) may include an Ethernet interface, a WiFi interface, a cellular interface, a mmWave interface, a reduced gigabit media independent interface (RGMII), or generally any interface for connecting to a network. The one or more network interfaces 716 may include, or may be coupled to, a physical layer module. In this manner, the electronic system 700 can be a part of one or more networks of computers (such as a local area network ("LAN"), a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving a plurality of packets over a plurality of physical layer modules from another device;
   generating a block acknowledgment packet that indicates that the plurality of packets have been received from the another device;
   deferring transmission of the block acknowledgement packet when a size of a retransmission buffer at the another device satisfies an acknowledgment deferral factor;
   after the deferring, selecting one of the plurality of physical layer modules for transmission of the block acknowledgment packet; and
   providing the block acknowledgment packet to the selected one of the plurality of physical layer modules for transmission to the another device.

2. The method of claim 1, further comprising:
   receiving one or more additional packets via one or more of the plurality of physical layer modules while the transmission of the block acknowledgement packet is being deferred;
   adding an indication to the block acknowledgment packet that indicates that the one or more additional packets have been received; and
   when the one or more acknowledgment deferral factors are not satisfied, providing the block acknowledgment packet with the added indication to the selected one of the plurality of physical layer modules for transmission to the another device.

3. The method of claim 1, wherein the block acknowledgment packet further indicates the one of the plurality of physical layer modules over which each of the plurality of packets was received.

4. The method of claim 1, wherein each of the plurality of physical layer modules over which the plurality of packets were received is associated with a different frequency band.

5. The method of claim 1, wherein the block acknowledgment packet further indicates that at least one packet was not received over at least one of the plurality of physical layer modules.

6. The method of claim 1, wherein the one of the plurality of physical layer modules is selected for the transmission of the block acknowledgment packet based at least in part on a channel availability associated with the selected one of the plurality of physical layer modules.

7. The method of claim 1, wherein the plurality of packets are received by a media access control (MAC) module.

8. A device comprising:
   a memory; and
   at least one processor configured to:
     receive a plurality of packets over a plurality of physical layer modules from another device;
     generate a block acknowledgment packet that indicates that the plurality of packets have been received from the another device;
     defer transmission of the block acknowledgement packet when a size of a retransmission buffer at the another device satisfies an acknowledgment deferral factor;
     select one of the plurality of physical layer modules for transmission of the block acknowledgment packet; and
     provide the block acknowledgment packet to the selected one of the plurality of physical layer modules for transmission to the another device.

9. The device of claim 8, wherein the at least one processor is further configured to:
   receive one or more additional packets via one or more of the plurality of physical layer modules while the transmission of the block acknowledgement packet is being deferred;
   add an indication to the block acknowledgment packet that indicates that the one or more additional packets have been received; and
   when the one or more acknowledgment deferral factors are not satisfied, provide the block acknowledgment packet with the added indication to the selected one of the plurality of physical layer modules for transmission to the another device.

10. The device of claim 8, wherein the block acknowledgment packet further indicates the one of the plurality of physical layer modules over which each of the plurality of packets was received.

11. The device of claim 8, wherein each of the plurality of physical layer modules over which the plurality of packets were received is associated with a different frequency band.

12. The device of claim 8, wherein the block acknowledgment packet further indicates that at least one packet was not received over at least one of the plurality of physical layer modules.

13. The device of claim 8, wherein the one of the plurality of physical layer modules is selected for the transmission of the block acknowledgment packet based at least in part on a channel availability associated with the selected one of the plurality of physical layer modules.

14. The device of claim 8, wherein the plurality of packets are received by via media access control (MAC) module.

15. A computer program product comprising code stored in a non-transitory computer-readable storage medium, the code, when executed by one or more processors, causes the one or more processors to perform operations comprising:
   receiving a plurality of packets over a plurality of physical layer modules from another device;

generating a block acknowledgment packet that indicates that the plurality of packets have been received from the another device;

deferring transmission of the block acknowledgement packet when a size of a retransmission buffer at the another device satisfies an acknowledgment deferral factor;

selecting one of the plurality of physical layer modules for transmission of the block acknowledgment packet; and providing the block acknowledgment packet to the selected one of the plurality of physical layer modules for transmission to the another device.

16. The computer program product of claim 15, wherein the plurality of packets are received by via media access control (MAC) module.

17. The computer program product of claim 15, wherein the block acknowledgment packet further indicates the one of the plurality of physical layer modules over which each of the plurality of packets was received.

18. The computer program product of claim 15, wherein each of the plurality of physical layer modules over which the plurality of packets were received is associated with a different frequency band.

19. The computer program product of claim 15, wherein the block acknowledgment packet further indicates that at least one packet was not received over at least one of the plurality of physical layer modules.

20. The computer program product of claim 15, wherein the one of the plurality of physical layer modules is selected for the transmission of the block acknowledgment packet based at least in part on a channel availability associated with the selected one of the plurality of physical layer modules.

* * * * *